US011714011B2

United States Patent
Muenster et al.

(10) Patent No.: US 11,714,011 B2
(45) Date of Patent: Aug. 1, 2023

(54) NANOMATERIALS FOR ATTACHING MECHANICAL FORCE SENSORS

(71) Applicant: TEXAS INSTRUMENTS INCORPORATED, Dallas, TX (US)

(72) Inventors: Ralf Jakobskrueger Muenster, Saratoga, CA (US); Sreenivasan Kalyani Koduri, Allen, TX (US); Benjamin Stassen Cook, Los Gatos, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 438 days.

(21) Appl. No.: 16/843,659

(22) Filed: Apr. 8, 2020

(65) Prior Publication Data
US 2020/0319038 A1  Oct. 8, 2020

Related U.S. Application Data

(60) Provisional application No. 62/831,034, filed on Apr. 8, 2019.

(51) Int. Cl.
*G01L 1/00* (2006.01)
*C25D 7/00* (2006.01)
*G01L 3/02* (2006.01)

(52) U.S. Cl.
CPC .............. *G01L 1/005* (2013.01); *C25D 7/006* (2013.01); *G01L 3/02* (2013.01)

(58) Field of Classification Search
CPC . G01L 1/005; G01L 3/02; H01L 24/13; H01L 23/49811; C25D 7/006
USPC .................................................. 73/862.325
See application file for complete search history.

(56) References Cited

U.S. PATENT DOCUMENTS

| | | | | |
|---|---|---|---|---|
| 6,828,786 B2* | 12/2004 | Scherer | ................ | B82Y 15/00 324/300 |
| 7,713,849 B2* | 5/2010 | Habib | ................ | G01N 21/658 438/479 |
| 8,104,345 B2* | 1/2012 | Bruckl | ................ | G01P 15/105 73/514.31 |
| 8,347,726 B2* | 1/2013 | Kobayashi | ............ | G01L 1/044 977/956 |
| 11,239,195 B2* | 2/2022 | Koduri | ............ | H01L 23/49517 |
| 2005/0214661 A1* | 9/2005 | Stasiak | .................... | C12Q 1/68 257/E21.585 |
| 2008/0264185 A1* | 10/2008 | Kobayashi | ............ | B82Y 15/00 73/862.637 |
| 2010/0050788 A1* | 3/2010 | Shim | ...................... | G01L 1/044 702/41 |
| 2014/0342177 A1* | 11/2014 | Wiley | ................... | H01B 1/026 428/605 |

* cited by examiner

*Primary Examiner* — Octavia Davis Hollington
(74) *Attorney, Agent, or Firm* — Dawn Jos; Frank D. Cimino

(57) ABSTRACT

A system comprises a member to receive a mechanical force, and a sensor to sense the mechanical force. The sensor is mounted on the member using a set of nanoparticles and a set of nanowires coupled to the set of nanoparticles.

21 Claims, 7 Drawing Sheets

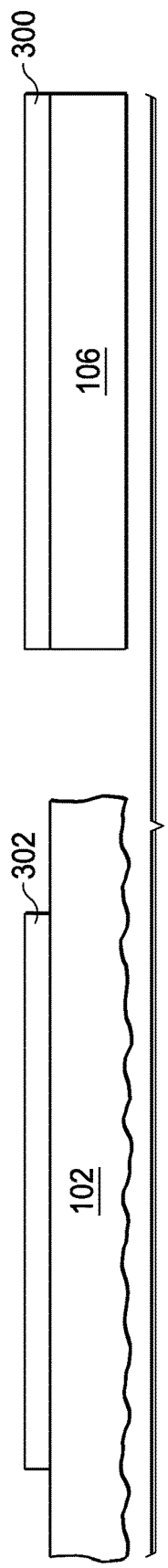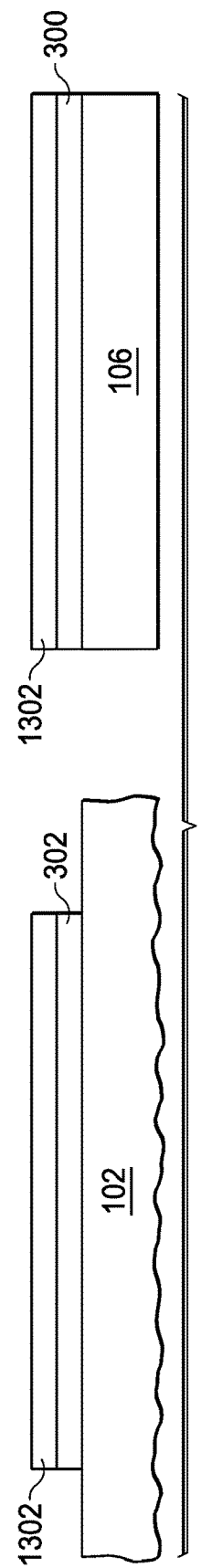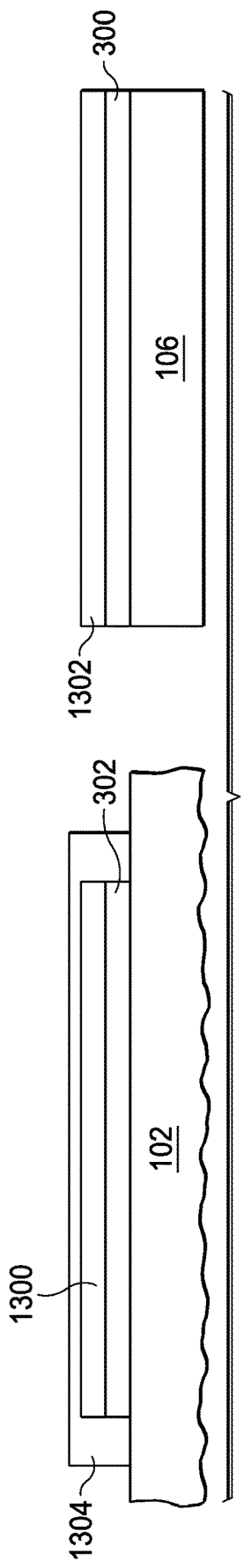

NANOMATERIALS FOR ATTACHING MECHANICAL FORCE SENSORS

CROSS-REFERENCE TO RELATED APPLICATIONS

The present application claims priority to U.S. Provisional Patent Application No. 62/831,034, which was filed Apr. 8, 2019, is titled "Nanowire Torque/Strain Sensor Attach," and is hereby incorporated herein by reference in its entirety.

BACKGROUND

Mechanical systems include numerous parts, or members, that are subject to various mechanical forces. For example, certain members may be subject to torque or strain. Sensors may be used to measure the mechanical forces applied to a particular member in a mechanical system. Typically, such sensors are mounted on the relevant member using a pliable attach material, such as epoxy or glue. When the member is subjected to a mechanical force that the sensor is able to measure, the member translates that mechanical force to the sensor via the pliable attach material.

SUMMARY

In examples, a system comprises a member to receive a mechanical force, and a sensor to sense the mechanical force. The sensor is mounted on the member using a set of nanoparticles and a set of nanowires coupled to the set of nanoparticles. The set of nanowires is aligned substantially in a vertical direction, the vertical direction being perpendicular to a length-wise surface of the sensor.

In examples, a system comprises a member to receive a mechanical force, a first set of nanowires coupled to the member, and a sensor to measure the mechanical force. The sensor has a second set of nanowires coupled thereto, and the first and second sets of nanowires are coupled to each other. The first set of nanowires and the second the first set of are aligned substantially in a vertical direction, the vertical direction being perpendicular to a length-wise surface of the sensor.

In examples, a method comprises: providing a member to receive a mechanical force; providing a sensor to sense the mechanical force; depositing a set of nanoparticles on at least one of the member or the sensor; positioning a nanowire template above the set of nanoparticles, the nanowire template having a set of orifices passing through the nanowire template; electroplating the set of nanoparticles to cause nanowires to form in the set of orifices of the nanowire template; and using the nanowires to couple the member and the sensor together.

BRIEF DESCRIPTION OF THE DRAWINGS

For a detailed description of various examples, reference will now be made to the accompanying drawings in which:

FIGS. 13A-13H together form a process flow diagram depicting the fabrication of a nanowire connection between a mechanical force sensor and a member of a mechanical system, in accordance with various examples.

DETAILED DESCRIPTION

Figure 1:
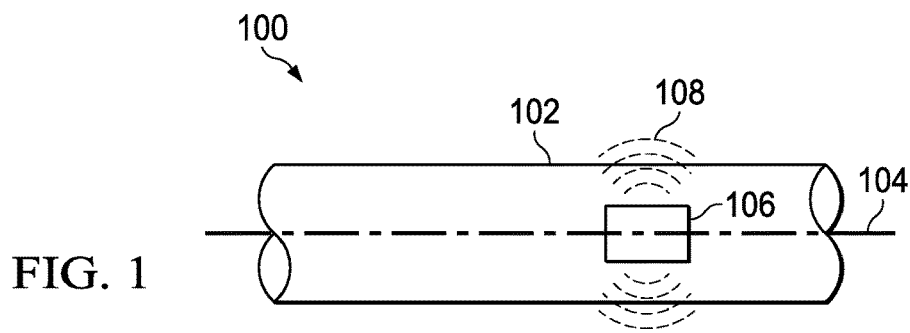
FIG. 1 depicts a member of a mechanical system having a mechanical force sensor coupled thereto using nanowires, in accordance with various examples.

As explained above, in some mechanical systems, members that are subject to certain mechanical forces are equipped with sensors that are able to measure such forces. When a member is subjected to a mechanical force that its sensor is able to measure, the member translates the mechanical force to the sensor via the pliable attach material.

This structure results in numerous disadvantages. For instance, because the attach material is pliable instead of being rigid, the mechanical force is not efficiently translated to the sensor, and so the sensor does not properly sense the mechanical force being applied. In addition, the maximum strength of the pliable attach material, which is lower than that of a rigid material, is typically a limiting factor for the maximum mechanical force that can be translated to the sensor. Furthermore, such pliable attach materials tend to have poor aging profiles and, as a result, they have limited long-term reliability. In addition, manufacturing the structure is tedious, as the application of a pliable attach material such as glue involves undesirably numerous steps.

This disclosure describes various examples of mechanical members that have sensors rigidly mounted thereto using nanowires in lieu of pliable attach materials. In examples, nanoparticles are deposited on the member, the sensor, or both. A nanowire template is positioned above the nanoparticles (in the event that nanoparticles are deposited on both the member and the sensor, multiple nanowire templates may be used). The nanowire template(s) contains multiple orifices, with each orifice being nanoscale in diameter (e.g., 1 micron diameter) and relatively long in comparison to the diameter (e.g., length at least twice the diameter). The nanoparticles are then used as a seed layer(s) in an electroplating process whereby nanowires are grown from the nanoparticles and through the orifices of the nanowire template(s). The nanowire template(s) is then removed, leaving the member, the sensor, or both having a set of nanowires formed thereupon. In the event that nanowires are formed on both the member and the sensor, the nanowires may be pressed together, and the pressure alone may generate sufficient heat to fuse (e.g., melt) the nanowires together, as nanowires tend to have low melting points. In the event that nanowires are formed on only the member, the nanowires may be pressed against the sensor in the presence of adequate heat (e.g., 100-200 degrees Celsius), thereby fusing the nanowires to the sensor. Similarly, in the event that nanowires are formed on only the sensor, the nanowires may be pressed against the member in the presence of adequate heat, thereby fusing the nanowires to the member.

The nanowires are formed of rigid metal (e.g., gold). Because the nanowires are rigid, mechanical forces are efficiently translated from the member to the sensor via the nanowires. For the same reason, the various disadvantages described above with respect to the pliable attach material (e.g., low maximum strength, poor aging profiles) are mitigated. Various other benefits also may be realized, such as the ability for the rigid attach material—that is, the nanowires—to withstand mismatches in coefficients of thermal expansion of connecting components, as well as enhanced stability and predictability of contact resistances of the nanowires over the life of the mechanical system.

FIG. 1 depicts an illustrative mechanical system 100, in accordance with various examples. The mechanical system 100 may be, for instance, an engine, a braking system, a recreational apparatus such as a bicycle, a heating/ventilation/air conditioning (HVAC) system, or any other system that is subject to mechanical forces (e.g., torque, strain) that may be sensed using a sensor. Because the number and types of systems that may experience such mechanical forces are vast, the number and types of systems that may benefit from the features of the mechanical system 100 are likewise vast.

The mechanical system 100 includes a member 102. The member 102 may be any component of the mechanical system 100 that is subject to mechanical forces that may be sensed by a sensor. In examples, the member 102 comprises a shaft. In examples, the member 102 comprises a rotor, such as a rotor that rotates about an axis 104.

The mechanical system 100 further comprises a sensor 106 mounted to an outer surface of the member 102. The sensor 106 may be any type of sensor that measures any mechanical force to which the member 102 may be subjected. In examples, the sensor 106 is a sensor that measures a mechanical force that is applied to the member 102 and that is efficiently translated from the member 102 to the sensor 106 when there is a rigid connection between the member 102 and the sensor 106. In examples, the sensor 106 is a torque sensor. In examples, the sensor 106 is a strain sensor. Other types of sensors are contemplated and included within the scope of this disclosure. In some examples, the sensor 106 is a wireless sensor capable of wireless communications (e.g., communication of sensor measurements) to another computing device, such as a notebook computer.

Figure 2:
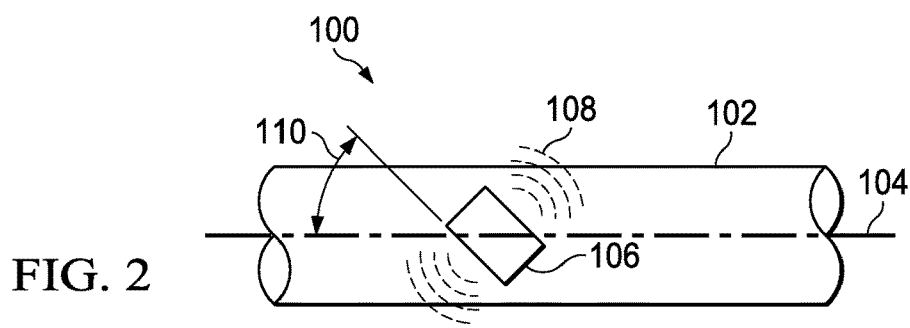
FIG. 2 depicts a member of a mechanical system having a mechanical force sensor coupled thereto using nanowires, in accordance with various examples.

As depicted in FIG. 1, the sensor 106 is mounted substantially parallel to the axis 104. FIG. 2 depicts the same components as FIG. 1 but with a sensor 106 that is mounted to an angle 110 (e.g., a 45 degree angle) with respect to the axis 104. In some examples, the orientation depicted in FIG. 1 may be used for strain measurements, and in some examples, the orientation depicted in FIG. 2 may be used for torque measurements, as torque is generally strongest at a 45 degree angle with respect to a central axis 104. Other orientations are contemplated and included in the scope of this disclosure.

As explained above, numerous benefits may be realized by mounting the sensor 106 to the member 102 using a rigid attach material in lieu of a pliable attach material. For example, using a rigid metal, such as gold, is superior to the use of a pliable material, such as glue. Accordingly, this disclosure contemplates various configurations in which nanowires are used to mount the sensor 106 to the member 102. As can be seen from FIG. 3, the set of nanowires 304 and 306 are aligned substantially in a vertical direction, the vertical direction being perpendicular to a length-wise surface of the sensor (top surface of the sensor 106. In examples, a nanowire is a strip of material (e.g., metal) that is at least twice as long as it is wide or deep. In examples, a nanowire is a strip of material (e.g., metal) that is at least twice as long as its diameter. In examples, a nanowire is a strip of material (e.g., metal) that is at least 10 times as long as it is wide or deep, or at least 10 times as long as its diameter. In examples, a nanowire is a strip of material (e.g., metal) that is at least 1000 times as long as it is wide or deep, or at least 1000 times as long as its diameter. In examples, the width of a nanowire is 1 micron. In examples, a depth of a nanowire is 1 micron. In examples, a diameter of a nanowire is 1 micron. In examples, a nanowire comprises any suitable rigid material, such as a metal (e.g., gold) or a metal alloy.

FIGS. 3-10 depict variations of a nanowire connection between the mechanical force sensor 106 and the member 102 of the mechanical system 100, in accordance with various examples. (The various components in each of these drawings, as well as the remaining drawings in this disclosure, are not necessarily to scale.) The sensor 106 has a bottom surface to which is coupled a metal plate 300. The metal plate 300 may comprise any suitable metal, such as copper. The bottom surface of the sensor 106 may be a semiconductor wafer, another metal, or any other suitable material to which the metal plate 300 may adequately couple. Similarly, the member 102 has a top surface to which is coupled a metal plate 302. The metal plate 302 may comprise any suitable metal, such as copper. The top surface of the member 102 may be a metal, such as steel, although the scope of this disclosure is not limited to any particular material. The metal plate 300 has extending therefrom a set of nanowires 304. Any number of nanowires may be present in the set. The nanowires 304 are composed of a rigid attach material, such as gold or any other suitable metal or metal alloy. Similarly, the metal plate 302 may have extending therefrom a set of nanowires 306. Any number of nanowires may be present in this set. The nanowires 306 are composed of a rigid attach material, such as gold or any other suitable metal or metal alloy. The nanowires 304 and 306 are fused (e.g., melted) together, thus forming a rigid bond between the sensor 106 and the member 102.

As shown, the nanowires 304 and 306 do not necessarily couple to each other in an orderly fashion. Rather, in examples, the nanowires 304 and 306 couple to each other in a randomized manner. This may include some of the nanowires 304, 306 being pulled in various directions, including left, right, backward, forward, etc.

Figure 3:
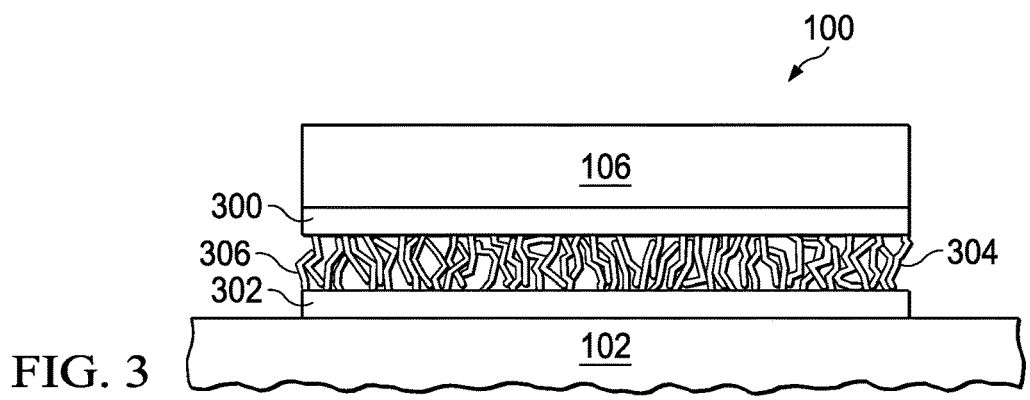
FIGS. 3-10 depict variations of a nanowire connection between a mechanical force sensor and a member of a mechanical system, in accordance with various examples.

The nanowires 304 and 306 may be fused by pressing the two sets of nanowires together, thus generating sufficient heat to cause fusion. (Nanoscale materials may have a substantially increased surface area relative to volume, thus considerably increasing the number of defects on the surface and thereby depressing the melting point of the nanoscale material.) In general, any two nanowires may fuse together at any point or points of contact. In examples, the fusion of two nanowires generally occurs along the lengths of the nanowires, as shown in FIG. 3, for example. (Similar depictions are provided in FIGS. 4-6 and 13H.) A fusion along the lengths of two nanowires may be complete, meaning that the entire lengths of the two nanowires are fused together. In some examples, the fusion along the lengths of two nanowires may be incomplete, meaning that only portions of the lengths of the two nanowires are fused together, and these portions may be contiguous or separate. In some examples, a pair of nanowires may fuse together using a distal end of one of the nanowires in the pair. In some examples, three or more nanowires may bunch together and couple together along their lengths or in another suitable manner. In some examples, one or more nanowires may wrap around one or more other nanowires. Any and all such manners of fusion are contemplated and included within the scope of this disclosure.

Fusion between nanowires may occur as a result of nanowires contacting each other with a minimum amount of pressure and/or temperature. For example, at room temperature (e.g., approximately 10 degrees Celsius to approximately 30 degrees Celsius), pressures greater than 100 MPa are sufficient to cause fusion. Temperatures of approximately 80 degrees Celsius are sufficient to cause fusion without any additional pressure being added. Other combinations of pressure and temperature sufficient to cause melting and subsequent fusion of nanowires also may be used.

Due to the rigid connection provided by the nanowires 304, 306, a mechanical force applied to the member 102 is efficiently translated to the sensor 106 via the nanowires 304, 306, and the various shortcomings described above with respect to pliable attach materials are mitigated. Fabrication techniques for the structures of FIGS. 3-10 are described below.

The metal plates 300, 302 depicted in FIG. 3 are optional and may be included or omitted depending on design requirements. In some examples, additional metal plates may be used as interfaces. In some examples, fewer or no metal plates may be used. In some examples, one or more metal plates may be used on the sensor 106, with no metal plates mounted on the member 102. In other examples, one or more metal plates may be used on the member 102, with no metal plates mounted on the sensor 106. All such variations are contemplated and included in the scope of this disclosure.

Figure 4:
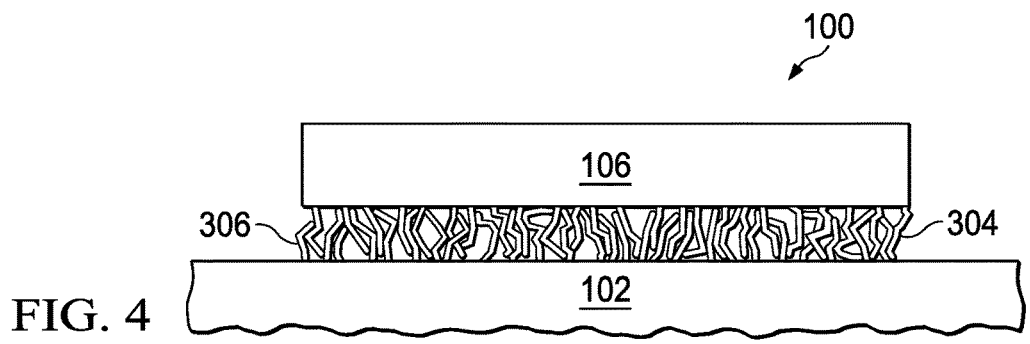

Accordingly, FIG. 4 depicts another variation of a nanowire connection between the sensor 106 and the member 102. In this example, the metal plates 300, 302 of FIG. 3 are omitted, with the nanowires 304, 306 extending from the sensor 106 and the member 102, respectively, and rigidly connecting to each other.

Figure 5:
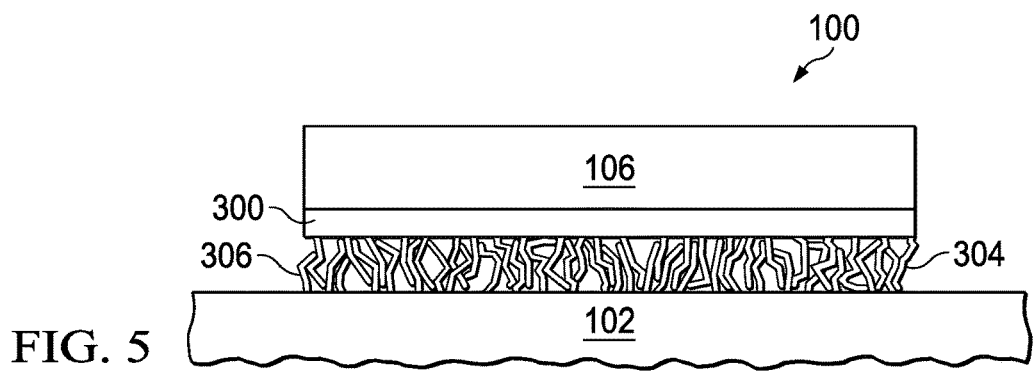

FIG. 5 depicts yet another variation of a nanowire connection between the sensor 106 and the member 102. In this example, the metal plate 300 is present, but the metal plate 302 is omitted. Thus, the nanowires 304 extend from the metal plate 300, and the nanowires 306 extend from the member 102. The nanowires 304, 306 rigidly couple to each other, as shown.

Figure 6:
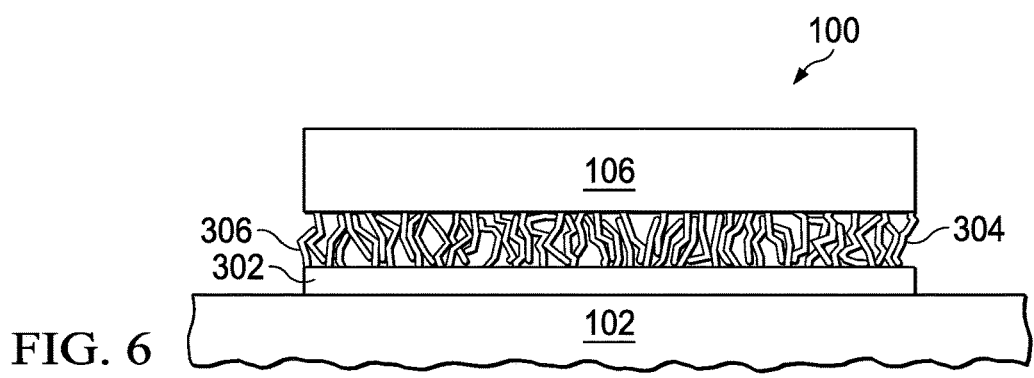

FIG. 6 depicts still another variation of a nanowire connection between the sensor 106 and the member 102. In this example, the metal plate 300 is omitted, but the metal plate 302 is present. Thus, the nanowires 304, 306 extend from the sensor 106 and the metal plate 302, respectively. The nanowires 304, 306 rigidly couple to each other, as shown.

Figure 7:
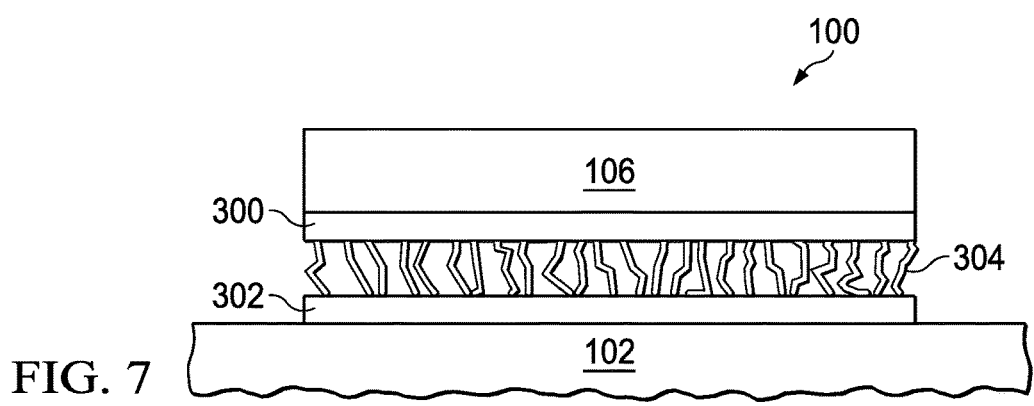

FIG. 7 depicts still another variation of a nanowire connection between the sensor 106 and the member 102. In this example, the metal plates 300, 302 are included, but only the metal plate 300 has nanowires extending therefrom (nanowires 304), while the member 102 does not. The nanowires 304 extend from the metal plate 300 and are fused with the metal plate 302, for example by making contact with the metal plate 302 while being subjected to an adequate temperature for melting (e.g., 100-200 degrees Celsius). The nanowires 304 are depicted in FIG. 7 as being deformed due to the pressure applied to the nanowires 304 when making contact with the metal plate 302. In some examples in which both metal plates are included, the nanowires 304 may be omitted and nanowires 306 (not shown in FIG. 7) extending from the metal plate 302 may be used instead. These nanowires 306 may be fused to the metal plate 300 while making contact with the metal plate 300 and being subjected to an appropriate melting temperature.

Figure 8:
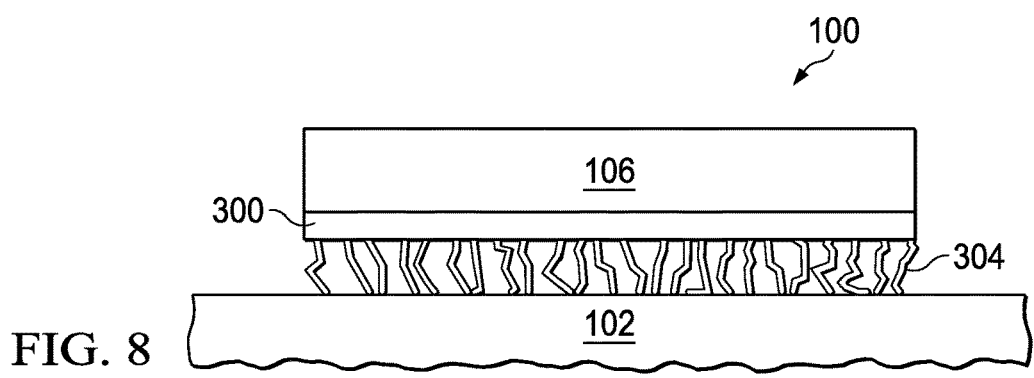

FIG. 8 depicts still another variation of a nanowire connection between the sensor 106 and the member 102. In this example, the metal plate 300 is included, but the metal plate 302 is omitted. The nanowires 304 extend from the metal plate 300 and are fused to the surface of the member 102, in a manner similar to that described above. In some examples, the nanowires 304 may be omitted and nanowires 306 may be used instead.

Figure 9:
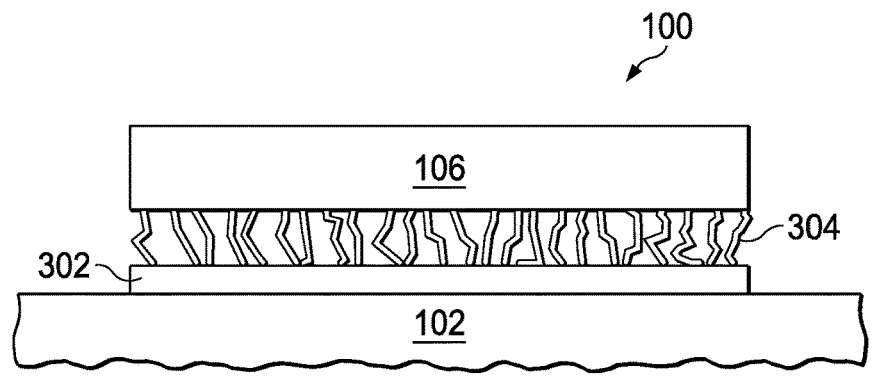

FIG. 9 depicts still another variation of a nanowire connection between the sensor 106 and the member 102. In this example, the metal plate 300 is omitted, but the metal plate 302 is included. The nanowires 304 extend from the surface of the sensor 106 and are fused with the metal plate 302, in a manner similar to that described above. In some examples, the nanowires 304 may be omitted and nanowires 306 may be used instead.

Figure 10:
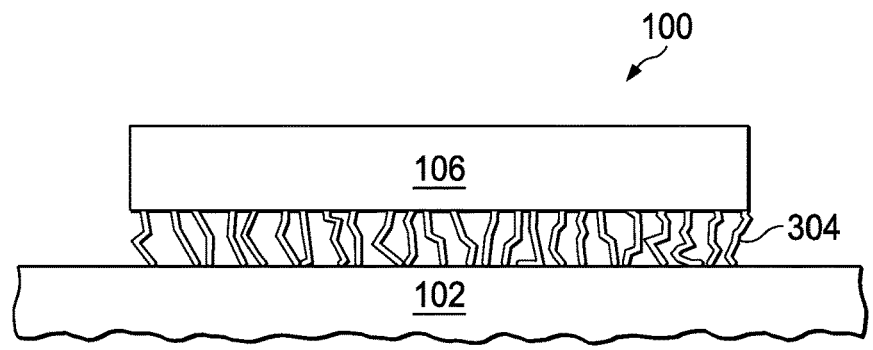

FIG. 10 depicts still another variation of a nanowire connection between the sensor 106 and the member 102. In this example, both metal plates 300, 302 are omitted. The nanowires 304 extend from the surface of the sensor 106 and are fused to the surface of the member 102, in a manner similar to that described above. In some examples, the nanowires 304 may be omitted and nanowires 306 may be used instead.

Figure 11:
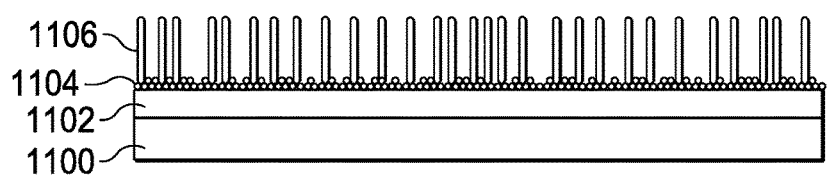
FIG. 11 depicts a set of nanowires plated on a set of nanoparticles, the set of nanoparticles deposited on a metal plate that is coupled to a mechanical system member or a mechanical force sensor, in accordance with various examples.
Figure 12:
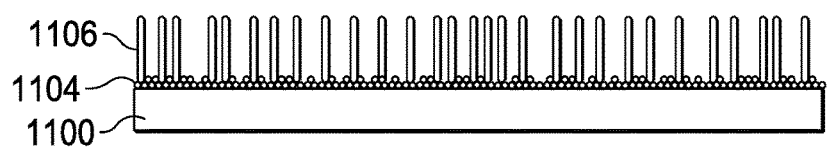
FIG. 12 depicts a set of nanowires plated on a set of nanoparticles, the set of nanoparticles deposited on a mechanical system member or a mechanical force sensor, in accordance with various examples.

FIGS. 11-12 are detailed views of the various structures described above with respect to FIGS. 3-10. FIGS. 11-12 are more detailed than FIGS. 3-10 at least because they expressly depict the nanoparticles, described below, that are used to generate the nanowires. (The nanoparticles are not expressly depicted in FIGS. 3-10 to preserve simplicity and clarity of illustration. However, the nanoparticles are also included in the structures of FIGS. 3-10.) Specifically, FIG. 11 depicts a surface 1100, such as a surface of the sensor 106 or the member 102. A metal plate 1102, which in some examples is the metal plate 300 or metal plate 302, abuts the surface 1100. As with the metal plates 300, 302, the metal plate 1102 may be, for instance, copper or any other suitable metal. In addition, although only one metal plate 1102 is shown, any number of metal plates may form a stack that abuts the surface 1100.

A set of nanoparticles 1104 is deposited on the metal plate 1102, for example, using a printing technique. The nanoparticles 1104 may be on the scale of, e.g., approximately 1 micron in diameter. In some examples, the nanoparticles 1104 are less than 1 micron in diameter. In some examples, the nanoparticles 1104 comprise titanium. In some examples, the nanoparticles 1104 comprise tungsten. In some examples, the nanoparticles 1104 comprise a titanium-tungsten alloy. In some examples, the nanoparticles 1104 comprise nickel palladium. A variety of other metals or metal alloys may be used, and the scope of this disclosure is not limited to any particular metal or metal alloy. The set of nanoparticles 1104 may have a thickness ranging from 100 nm to 100 microns, with a thicker set of nanoparticles 1104 resulting in a more mechanically stable nanoparticle-nanowire structure. A set of nanowires 1106 extends from the nanoparticles 1104, as shown. The nanowires 1106 may be, e.g., the nanowires 304, 306. FIG. 12 is similar to FIG. 11 except that the metal plate 1102 is omitted. In this example, the set of nanowires 1106 are grown from the set of nanoparticles 1104, and the set of nanoparticles 1104 are deposited on the surface 1100.

The use of nanoparticles to plate nanowires is advantageous over the use of a base metal layer (e.g., a seed layer) to plate nanowires. Such base metal layers are typically formed using a subtractive process and, as a result, may involve numerous photolithography steps that add to manufacturing time and expense. In some cases, such layers may be formed using electroless plating, but this technique also introduces substantial time and costs. Using nanoparticles to plate nanowires is superior to these time-consuming and expensive techniques at least because the nanoparticles are easily deposited (e.g., printed) and melted (e.g., using any suitable energy source, for example a laser, to cause the nanoparticles to diffuse into the underlying layer), at which point the nanowires may be plated from the set of nanoparticles. Relative to other technologies, the resulting nanoparticle and nanowire combination has superior thermal and electrical conductivity, mechanical stability, and adhesion, and a lower melting point to facilitate easy coupling between devices (e.g., nanowire-to-nanowire coupling).

Figure 13D:
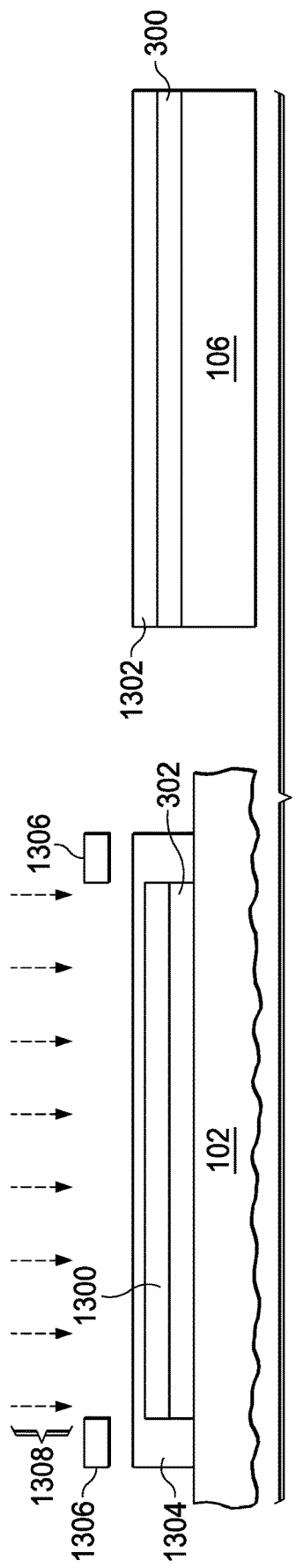
Figure 13E:
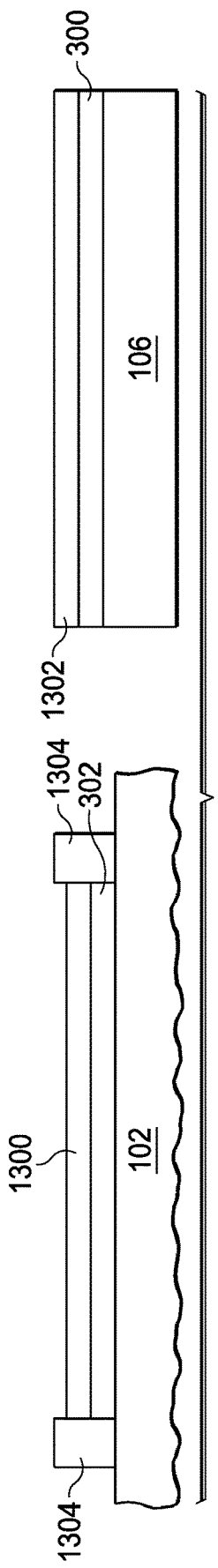

FIGS. 13A-13H together form a process flow diagram depicting the fabrication of a nanowire connection between a mechanical force sensor and a member of a mechanical system, in accordance with various examples. FIG. 13A depicts the member 102 having an optional metal plate 302 mounted thereupon, and it also depicts the sensor 106 having an optional metal plate 300 mounted thereupon. FIG. 13B depicts a set of nanoparticles 1300 deposited on the optional metal plate 302, and it also depicts a set of nanoparticles 1302 deposited on the optional metal plate 300. FIG. 13C depicts a photoresist layer 1304 deposited on the set of nanoparticles 1300 and the member 102. FIG. 13D depicts the positioning of a photomask 1306 above the photoresist layer 1304 and the application of light 1308. The light 1308 exposes the unmasked area of the photoresist layer 1304. The exposed area of the photoresist layer 1304 is developed and removed, leaving the structure shown in FIG. 13E.

Figure 13F:
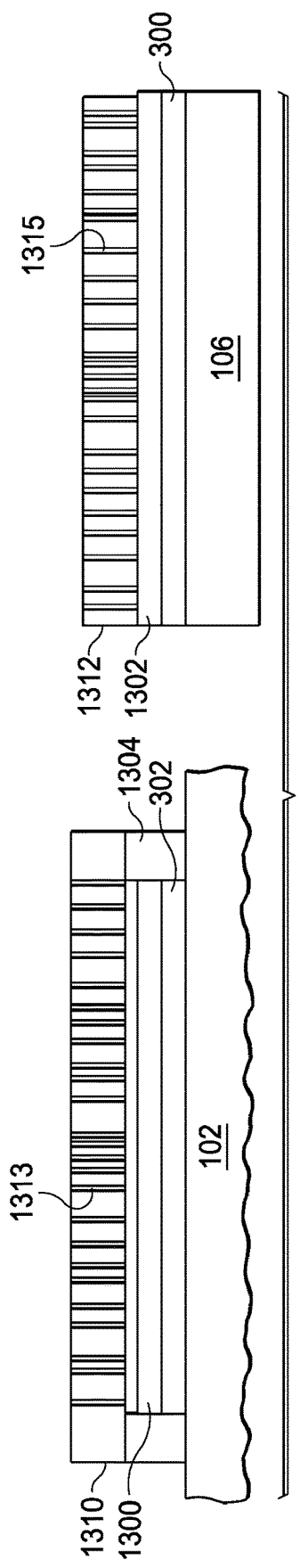

FIG. 13F depicts a nanowire template 1310 positioned above the photoresist layer 1304 and the set of nanoparticles 1300. Similarly, a nanowire template 1312 is positioned above the set of nanoparticles 1302. In some examples, the nanowire templates 1310, 1312 comprise plastic. In some examples, the nanowire templates 1310, 1312 comprises TEFLON®. In some examples, the nanowire templates 1310, 1312 are metal templates (e.g., anodized aluminum, nickel). Other materials may be used. The composition of the nanowire templates 1310, 1312 determines whether the photoresist layer 1304 is used or not. If the composition of the nanowire templates 1310, 1312 is such that the templates do not adhere adequately to the set of nanoparticles, the photoresist layer 1304 may be used. An example of this use of photoresist layer 1304 is shown on the left side of FIG. 13F. If the composition of the nanowire templates 1310, 1312 is such that the templates adhere adequately to the set of nanoparticles, the photoresist layer 1304 may be omitted. An example of this is shown on the right side of FIG. 13F.

Figure 13G:
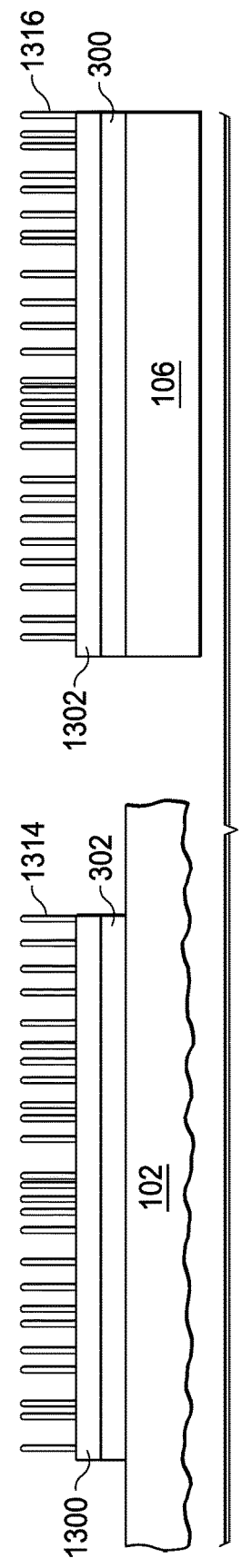
Figure 13H:
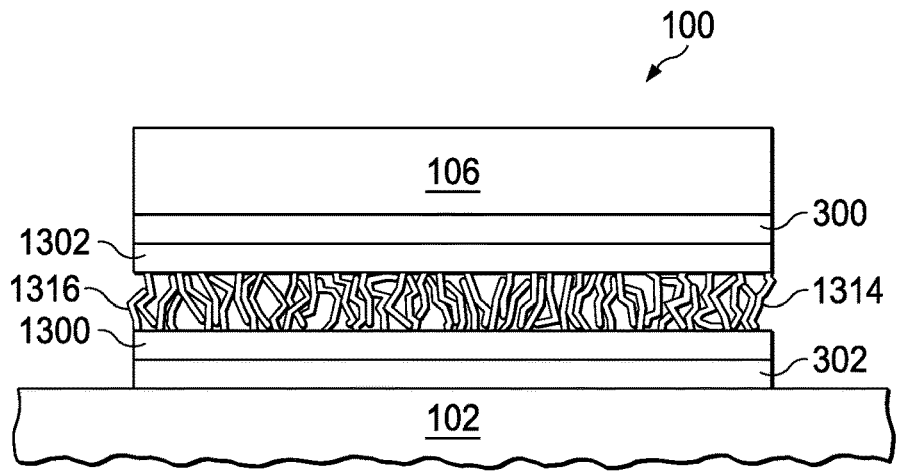

The nanowire templates 1310, 1312 contain orifices 1313, 1315, respectively. These orifices 1313, 1315 are nanoscale orifices, meaning that their dimensions are similar to those of the nanowires, as described above. An electroplating process is then performed, in some examples, using a solution that causes nanowires 1314, 1316 of the compositions described above to grow in the orifices 1313, 1315. The sets of nanoparticles 1300, 1302 serve as seed layers for these nanowires 1314, 1316 to grow. The nanowires 1314, 1316 have nanoscale dimensions as described above because the nanowire material is plated in the nanoscale orifices 1313, 1315. FIG. 13G depicts the nanowires 1314, 1316, with the nanowire templates 1310, 1312 removed. (The nanowire templates 1310, 1312 are removed using a technique that depends on the material of which they are composed.) For example, a metal nanowire template may be removed using a metal etch. FIG. 3H depicts the assembly on the right side of FIG. 3G coupled to the assembly on the left side of FIG. 3G, for example, by contacting the nanowires 1314, 1316 and applying sufficient pressure to cause the nanowires 1314, 1316 to fuse to each other.

Figure 14:
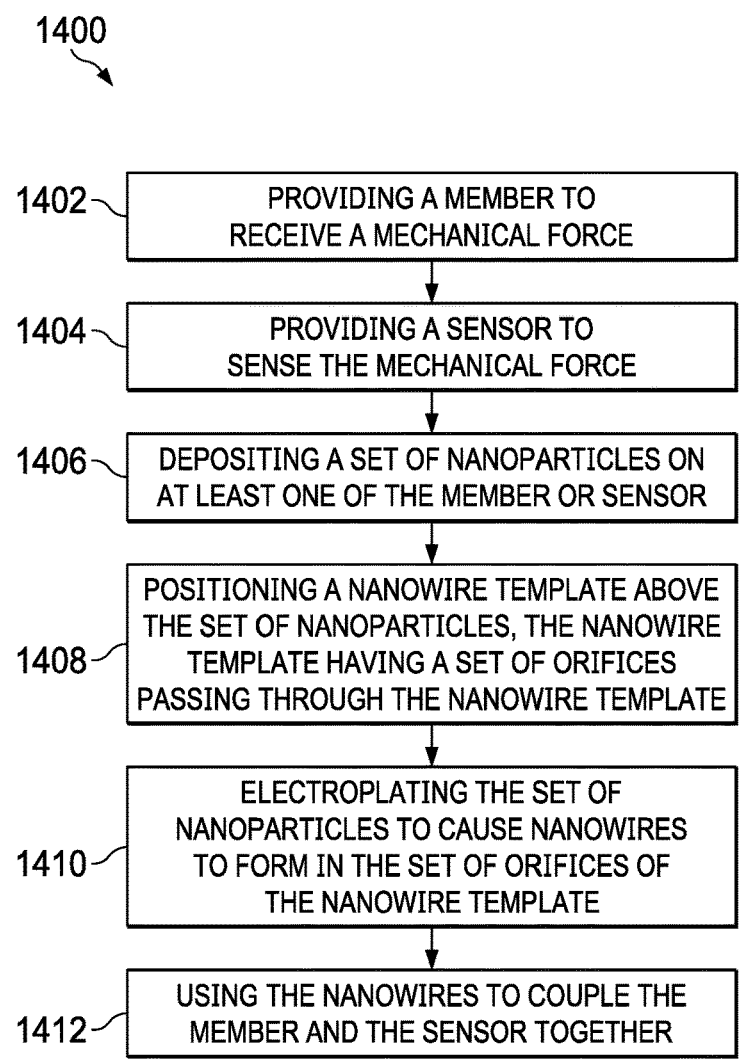
FIG. 14 is a flow diagram of a method for fabricating a nanowire connection between a mechanical force sensor and a member of a mechanical system, in accordance with various examples.

FIG. 14 is a flow diagram of a method 1400 for fabricating a nanowire connection between a mechanical force sensor and a member of a mechanical system, in accordance with various examples. The method 1400 begins by providing a member to receive a mechanical force (1402). The method 1400 comprises providing a sensor to sense the mechanical force (1404). The method 1400 also comprises depositing a set of nanoparticles on at least one of the member or the sensor (1406). The method 1400 comprises positioning a nanowire template above the set of nanoparticles, the nanowire template having a set of orifices passing through the nanowire template (1408). The method 1400 further comprises electroplating the set of nanoparticles to cause nanowires to form in the set of orifices of the nanowire template (1410). The method 1400 still further comprises using the nanowires to couple the member and the sensor together (1412). Additional steps may be included in the method 1400, as desired.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" or "to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   a member to receive a mechanical force; and
   a sensor to sense the mechanical force, the sensor mounted on the member using a set of nanoparticles and a set of nanowires coupled to the set of nanoparticles, wherein the set of nanowires is aligned substantially in a vertical direction, the vertical direction being perpendicular to a length-wise surface of the sensor.

2. The system of claim 1, wherein the set of nanoparticles is positioned on the member, and wherein the set of nanowires is formed on the set of nanoparticles.

3. The system of claim 1, wherein the set of nanoparticles is positioned on the sensor, and wherein the set of nanowires is formed on the set of nanoparticles.

4. The system of claim 1, further comprising a metal plate coupled to the set of nanoparticles.

5. The system of claim 4, wherein the metal plate is mounted to either the member or the sensor.

6. The system of claim 1, wherein the sensor is a torque sensor.

7. The system of claim 1, wherein the set of nanowires includes a nanowire having a diameter of approximately 1 micron and a length of at least 2 microns.

8. The system of claim 1, wherein the set of nanoparticles includes a nanoparticle having a diameter of 1 micron or less.

9. The system of claim 1, wherein the set of nanoparticles comprises titanium or a titanium-tungsten alloy.

10. The system of claim 1, wherein the set of nanowires comprises gold.

11. A system, comprising:
a member to receive a mechanical force;
a first set of nanowires coupled to the member; and
a sensor to measure the mechanical force, the sensor having a second set of nanowires coupled thereto, the first and second sets of nanowires coupled to each other, wherein the first set of nanowires and the second set of nanowires are aligned substantially in a vertical direction, the vertical direction being perpendicular to a length-wise surface of the sensor.

12. The system of claim 11, further comprising a first set of nanoparticles formed on the member, wherein the first set of nanowires is formed on the first set of nanoparticles.

13. The system of claim 11, further comprising a first set of nanoparticles formed on a metal plate, the metal plate mounted to the member, wherein the first set of nanowires is formed on the first set of nanoparticles.

14. The system of claim 11, further comprising a second set of nanoparticles formed on the sensor, wherein the second set of nanowires is formed on the second set of nanoparticles.

15. The system of claim 11, further comprising a second set of nanoparticles formed on a metal plate, the metal plate mounted to the sensor, wherein the second set of nanowires is formed on the second set of nanoparticles.

16. The system of claim 11, wherein the sensor is a torque sensor.

17. The system of claim 11, wherein the member comprises a rotor.

18. The system of claim 11, wherein each of the first and sets of nanowires includes at least one nanowire that has a diameter equal to or less than 1 micron and a length of at least 2 microns.

19. A method, comprising:
providing a member to receive a mechanical force;
providing a sensor to sense the mechanical force;
depositing a set of nanoparticles on at least one of the member or the sensor;
positioning a nanowire template above the set of nanoparticles, the nanowire template having a set of orifices passing through the nanowire template;
electroplating the set of nanoparticles to cause nanowires to form in the set of orifices of the nanowire template; and
using the nanowires to couple the member and the sensor together.

20. The method of claim 19, further comprising:
depositing another set of nanoparticles on the other of the member or the sensor;
positioning another nanowire template above the another set of nanoparticles, the another nanowire template having another set of orifices passing therethrough;
electroplating the another set of nanoparticles to cause additional nanowires to form in the another set of orifices of the another nanowire template; and
coupling the additional nanowires to the nanowires.

21. The method of claim 19, wherein depositing the set of nanoparticles on one of the member or the sensor comprises depositing the set of nanoparticles on a metal plate of the one of the member or the sensor.

* * * * *